Patented Dec. 27, 1938

2,141,615

UNITED STATES PATENT OFFICE 2,141,615

PRODUCTION OF EXTRACTS FROM CARBONACEOUS MATERIAL

Alfred Pott, Essen-on-the-Ruhr, Germany

No Drawing. Application November 30, 1935, Serial No. 52,442. In Germany May 24, 1935

6 Claims. (Cl. 196—14)

This invention relates to the production of extracts from carbonaceous material such as coal, lignite, peat, by means of organic solvents at normal or elevated pressure and raised temperature. Particularly, solvents like oils, such as hydrated and acidic oils, furthermore, mixtures of them and other solvents may be used.

Extracts so obtained are separated from the solid residues of the original material which cannot be dissolved any more in the solvent media, in order to render the extracts free from any admixtures resulting in ashes when the extract is burned.

Generally, extracts are separated from the solid residues by permitting the latter to settle while the extracts are still dissolved in the solvent media. In such a way the amount of solid residues remaining in the extracts may already be reduced to a few tenths of 1% up to 1%, but sometimes more.

I suggested in the co-pending application Serial No. 14,794 filed April 5, 1935, of which I am a joint inventor to filter such extracts while dissolved, preferably at elevated temperature and pressure. It was established that the contents of solid admixtures yielding ashes could be reduced thereby to a few tenths of 1%, and sometimes below one tenth percent.

It is an object of the invention to further reduce the content of such solid admixtures to extracts after having permitting the bulk of these admixtures to settle down.

Another object of the invention consists therein to further reduce the contents of such solid admixtures to the extracts after they have been filtered, particularly under elevated pressure and raised temperature.

Another object of the invention is to free such extracts from any such solid admixtures so far that no remainder of them can be ascertained by any method or means in use today for establishing ashes of combustible extracts. According to this invention, the extracts of solid carbonizable material obtained by solvents which are to a great extent of organic nature, are treated with acids. Thereby the ash content can be reduced below one tenth of one percent.

In particular, the invention uses inorganic acids which are preferably diluted in cases where strong inorganic acids like hydrochloric or sulphuric acid are used.

The treatment with acids may be applied to the extracts when separated from the solvents. Preferably, however, the acids are added when the extracts are still dissolved in the orignal solvents used for extraction purposes, or in other solvents added for this treatment or for filtration purposes. If strong inorganic acids are used, they may be considerably diluted. Hydrochloric acid, for instance, may be diluted to a content of only about 30% HCl.

Let me take as an example gas coal having a content of 28% of volatile material which is to be extracted by means of a solvent medium consisting of e. g. 80% tetraline which is a neutral organic solvent and 20% phenol. Cresols may be used instead of phenols, or other acidic oils may be admixed. The extraction may be performed according to the Patent 1,881,927 of which I am a joint-inventor. The solvents are applied in the same amount as the carbonizable material to be treated, or the solvents may be present in excess, such as in a ratio of 1.5:1. The carbonizable material mixed with the solvent medium is introduced in a closed vessel and heated in such a way that the rising temperatures remain close to the decomposition temperatures of the solid carbonaceous material and the residues resulting when the extraction proceeds.

In the example taken these temperatures will be close to about 330° C., 350° C., 380°, and 400° C. The last temperature represents the decomposition temperature of the last solid residues and must not be exceeded in order to avoid undesirable reductions of the yields of extracts. The pressures increase in the closed vessel corresponding to the rising temperature and somewhat above, if a slight decomposition of the solvent medium occurs splitting off hydrogen. The pressures lie between about 10 atmospheres and 70 to 80 atmospheres per sq. cm. The extracts still dissolved in the solvent media are then submitted to filtration at temperatures lower than the last and highest temperature used. A preferable temperature range for filtration lies between about 70° and 170° C., and a preferable pressure range above 1 to about 20 atmospheres per sq. cm.

The extracts so filtered and still dissolved are then mixed with diluted hydrochloric acid, the amount of acid added forming a fraction of that of the solvent medium present, but may be equal to it, or exceed it. During this treatment, this acidic mixture may be either at room temperature or at elevated temperature. Preferably, temperatures between about 50 to 60° C., and above, are observed.

A sample was taken from the dissolved extracts just after extraction had been completed at about 400° C., and the solid admixtures still in the solution were permitted to settle. The extracts were then separated from the solvents and the ash content established. It amounted to a little more than 1%.

Another sample was taken of the dissolved extract after filtration, the solvent medium was driven off and the ash content of the extract established. This was still between about 0.08% and 0.1%.

Lastly, a sample was taken of the extract obtained by separation from the solvent and acids at the end of a method performed according to this invention. Ash content was established with maximum 0.2%.

Taking into consideration the extreme difficulty of removing such traces of ashes formed by the last solid residues present in the extracts, the eminent advantage of the acid treatment according to this invention becomes apparent.

According to the method of this invention, the amount of the traces of ash present in the extract could be reduced from 0.08 to 0.02%, i. e. to a fourth of the amount present when filtrating only, and to a few hundredths of 1%.

Depending upon the nature of the original carbonaceous material, the ash content can be further reduced below 0.02% by a treatment according to this invention.

Particularly, if such treatment of the extracts with diluted strong inorganic acids at elevated temperatures is repeated, the ash content may be further reduced, ultimately to an amount which cannot be ascertained any more by any method and means known today, so that such extracts must be considered free from ash.

The result obtained by the invention may be explained by the fact that the solid residues in question are attacked by the acids and transformed into a state in which they are soluble in the solvents still present, or in a diluted acid itself, forming a kind of acid sludge so that they may be separated from the extracts together with the solvents and/or acids, or they may be permitted to settle out of such a solution.

Particularly, if acidic solvent media are used, such as phenols containing solvents, the treatment according to the invention is of extraordinary effect. This may be due to the fact that such acidic oils like phenols, cresols, etc., furthermore soluble salts such as carbonates, chlorides, etc., and additional constituents forming solid incombustible admixtures (ash), and furthermore admixtures resulting from the material of the apparatus used, are dissolved forming phenolates. When the dissolved extracts are filtered in order to separate them from the soluble residues and ash, these phenolates remain dissolved in the filtered extract solution. When the solvent media are driven off in order to separate the extracts from them, the inorganic constituents of these phenolates remain in the extracts and form ash. If, however, the extracts are treated—particularly, while still in solution in their solvent media—with acids, especially inorganic acids, the inorganic constituents combined in the phenolates are washed out by the acid and may settle, or may be separated from the extracts together with the acids.

Organic acids may also be used, but inorganic ones are to be preferred. Organic acids are ready to dissolve in the inorganic solvent media used for the extraction and render these solvents impure. Furthermore, it is very difficult to separate such organic acids again from the organic solvents, while inorganic acids may easily be separated from the solution consisting of the solvent media and the extracts, whereby the inorganic impurities are taken off by inorganic acids separated from the solution either by allowing them to settle, or cooling the solution, or distilling off the organic solvents and then permitting to settle the extracts and acids whereby they separate entirely.

The extracts so separated from the acids may then be washed, in particular with water, in order to remove last traces of acids.

Extracts free to such a high degree from inorganic impurties forming ash, are useful for several purposes. For instance, solid extracts practically free of ashes are useful as powdered fuel in combustion engines. Such extracts may also be smouldered or coked in order to render an ash-free semi-coke or coke. They may further be used as an intermediate product for the manufacture of graphite and electrical material such as electrodes.

In all these cases and other ones, practical or complete absence of traces of ashes is of the highest importance.

The solvent media driven off from the extracts and separated from the acids may be condensed and utilized in a subsequent extraction process.

What I claim is:

1. In a method of producing extracts from solid carbonizable material by treating said material with liquid solvents the major portion of which consists of tetraline, the steps of separating said extracts from solid residues of said material, treating said separated extracts containing traces of ash-forming residues with acid within a temperature range from room temperature to about 60° C., thereby removing substantially said traces from said extracts, and separating said extracts from said acid.

2. In a method of producing extracts from solid carbonizable material by treating said material with liquid solvents the major portion of which consists of tetraline, the steps of separating said extracts from solid residues of said material, treating said separated extracts containing traces of ash-forming residues with acid within a temperature range from room temperature to about 60° C., thereby removing substantially said traces from said extracts, and separating said extracts from said acid and solvents.

3. In a method of producing extracts from solid carbonizable material by treating said material with liquid solvents the major portion of which consists of tetraline, the steps of separating said extracts from solid residues of said material, treating said separated extracts containing traces of ash-forming residues in amounts of a few tenths of one per cent and more with acid at temperatures above room temperature until the amount of said traces still present in said extracts is reduced substantially below one tenth of one per cent, and separating said extracts from said acid.

4. A method of producing extracts from solid carbonizable material, comprising treating said material in a closed vessel with organic solvent media containing a major portion consisting of tetraline and a minor portion consisting of acidic organic solvents as exemplified by phenol, raising the temperature of treatment so as to keep it close to the decomposition temperatures of said material and the solid residues resulting therefrom during extraction, thereby increasing the pressure within said vessel, stopping the extraction after the decomposition temperature of the last solid residue is approximately reached, separating the dissolved extracts from the solid residues by filtration at elevated temperatures between about 70° to 170° C. and superatmospheric pressures, treating the so separated dissolved extracts with diluted strong inorganic acid with a temperature range from room temperature to about 60° C., and separating the extracts from said solvents and acids.

5. A method of producing extracts from solid carbonizable material, comprising treating said material in a closed vessel with organic solvent media containing appreciable amounts of tetraline, raising the temperature of treatment so as to keep it close to the decomposition temperature of said material and the solid residues resulting therefrom during extraction, thereby increasing the pressure within said vessel, stopping the extraction after the decomposition temperature of the last solid residue is approximately reached, separating the dissolved extracts from the solid residues by filtration at elevated temperatures between about 70° to 170° C. and superatmospheric pressures, treating the so separated dissolved extracts with diluted strong inorganic acid within a temperature range from room temperature to about 60° C., and separating the extracts from said solvents and acid.

6. In a method of producing extracts from solid carbonizable material by treating said material with liquid solvents, a major portion of which consists of tetraline and a minor portion of which consists of acidic organic solvents as exemplified by phenol, the steps of separating said extracts from solid residues of said material, treating said separated extracts containing traces of ash-forming residues with acid within a temperature range from room temperature to about 60° C., thereby removing substantially said traces from said extracts, and separating said extracts from said acid.

ALFRED POTT.